(12) United States Patent
Swanson

(10) Patent No.: US 7,001,585 B2
(45) Date of Patent: Feb. 21, 2006

(54) METHOD OF MAKING BARIUM TITANATE

(75) Inventor: Donald Keith Swanson, Hillsborough, NJ (US)

(73) Assignee: Ferro Corporation, Cleveland, OH (US)

( * ) Notice: Subject to any disclaimer, the term of this patent is extended or adjusted under 35 U.S.C. 154(b) by 456 days.

(21) Appl. No.: 10/421,376

(22) Filed: Apr. 23, 2003

(65) Prior Publication Data

US 2004/0213730 A1 Oct. 28, 2004

(51) Int. Cl.
*C01G 23/04* (2006.01)

(52) U.S. Cl. .......................... 423/598; 501/137; 556/55

(58) Field of Classification Search ................ 423/598, 423/593.1, 608; 501/137, 136; 556/40, 556/55

See application file for complete search history.

(56) References Cited

U.S. PATENT DOCUMENTS

| | | | |
|---|---|---|---|
| 4,863,883 A * | 9/1989 | Menashi et al. ............ 501/138 |
| 4,957,888 A * | 9/1990 | Brand et al. ................ 501/134 |
| 5,009,876 A | 4/1991 | Hennings et al. |
| 5,122,505 A * | 6/1992 | Gusman et al. ............. 505/425 |
| 5,783,165 A | 7/1998 | Wilson et al. |
| 6,136,229 A | 10/2000 | Cui et al. |
| 6,268,054 B1 | 7/2001 | Costantino et al. |
| 6,284,216 B1 * | 9/2001 | Sakai et al. ................. 423/598 |
| 6,352,681 B1 | 3/2002 | Horikawa et al. |
| 6,409,983 B1 | 6/2002 | Choi et al. |
| 2002/0048547 A1 | 4/2002 | Lee et al. |
| 2002/0171066 A1 * | 11/2002 | Venigalla et al. ........... 252/570 |
| 2003/0044347 A1 * | 3/2003 | Shirakawa et al. ......... 423/598 |

OTHER PUBLICATIONS

Wang et al., "Ultrafine Barium Titanate Powders vai Microemulsion Processing Routes," J. Am. Ceram. Soc., vol. 82, No. 4, 1999, pp. 873-881.

Hennings et al., "Defect Chemistry and Microstructure of Hydrothermal Barium Titanate," J. Am. Ceram. Soc., vol. 84, No. 1, 2001, pp. 179-182.

Hilton et al., "Recent Developments in the Manufacture of Barium Titanate Powders," Key Engineering Materials vols. 66 &67, 1992 pp. 145-183.

Hennings et al., "Solid-State Preparation of BaTiO3-Based Dielectrics Using Ultrafine Raw Materials," J. Am. Ceram. Soc., vol. 84, No. 12, 2001, pp. 2777-27782.

Fukazawa et al., "Properties of Barium Titanate Powders for Thin Layer MLCCs Produced by Chemical Processes," 20th Capacitor and Resistor Tech. Symposium, Mar. 2000, pp. 135-139.

Calbaugh et al., "Preparation of Barium Titanyl Oxalate Tetrahydrate for Conversion to Barium Titanate of High Purity," J. of Res. of the Natl. Bur. of Standards, vol. 56, No. 5, 1956, Paper 2677.

Schrey, "Effect of pH on the Chemical Preparation of Barium-Strontium Titanate," 66th Annual Meeting, The Amer. Cer. Soc., Apr. 22, 1964, Electronics Div., No. 27-L-64, pp. 401-405.

Yamamura et al., "Preparation of Barium Titanate by Oxalate Method in Ethanol Solution," Ceramics International, vol. 11, No. 1, 1985, pp.17-22.

Rhine et al., "Control of Ceramic Powder Composition by Precipitation Techniques," Ceramic Powder Science III, pp. 107-118.

Potdar et al., "Low-temperature synthesis of ultrafine barium titanate (BaTiO3) using organometallic barium and titanium precursors," Materials Letters, Oct. 1990, vol. 10, No. 3.

Potdar et al., "Alternative Route for Synthesis of Barium Titanyl Oxalate: Molecular Precursor for Microcrystalline Barium Titanate Powders," J. Am Ceram. Soc., vol. 79, No. 10, pp. 2795-2797.

* cited by examiner

*Primary Examiner*—Ngoc-Yen Nguyen
(74) *Attorney, Agent, or Firm*—Rankin, Hill, Porter & Clark LLP

(57) ABSTRACT

The present invention provides a method of making barium titanate powder. The method includes adding barium acetate to a solution of oxalic acid and titanium oxychloride to form barium titanyl oxalate and then calcining the barium titanyl oxalate to obtain barium titanate powder.

14 Claims, 5 Drawing Sheets

METHOD OF MAKING BARIUM TITANATE

BACKGROUND OF THE INVENTION

1. Field of Invention

The present invention relates to a method for making barium titanate powder. More particularly, the invention provides a method of making barium titanate powder by thermally decomposing a barium titanyl oxalate compound formed by adding barium acetate to a solution of oxalic acid and titanium oxychloride.

2. Description of Related Art

Barium titanate ($BaTiO_3$, hereinafter sometimes abbreviated as "BT") is one of the most widely used materials in electronic and microelectronic applications due to its excellent ferroelectric, piezoelectric, and dielectric properties. For example, BT powder is often used in the fabrication of multi-layer ceramic capacitors (hereinafter sometimes abbreviated as "MLCC's"), thermistors, and other electroceramic devices.

The trend toward continued miniaturization of electronic components has placed increasing demands on the BT powder used to fabricate such components. For example, as the fired dielectric thickness of MLCC's continues to decrease (e.g., to less than about 3 microns), it becomes necessary to make a finer BT powder with an average particle size of less than about 0.4 microns that contains no particles larger than about 1.5 microns. Furthermore, in order to make high quality MLCC's from dielectric formulations based on BT, it is preferable that the BT powder be highly crystalline (i.e., it exhibits defined tetragonality), dense, stoichiometric, and pure. Furthermore, it is desirable that the BT powder also possesses a narrow and monomodal particle size distribution (hereinafter sometimes abbreviated as "PSD"). A BT powder possessing all of these properties could be referred to as an "ideal" material for making MLCC's.

Many processes have been developed over the years in an attempt to address the need for a fine particle "ideal" BT powder. The four most popular commercialized processes for making BT powder are known in the art as: (1) the solid-state process; (2) the oxalate process; (3) the hydrothermal process; and (4) the sol gel process. An excellent review of some of these processes is described by A. D. Hilton and R. Frost in an article entitled "Recent Developments in the Manufacture of Barium Titanate Powders", *Key Engineering Materials*, Vols. 66 & 67, 1992, pp. 145–184.

BT powder (which is also sometimes referred to herein as "particles") can be formed via a solid-state reaction between barium carbonate ($BaCO_3$) and titanium dioxide ($TiO_2$) at temperatures greater than 900° C. In general, BT particles obtained via the solid-state route are typically highly crystalline and dense. However, BT particles formed in this manner are subject to Ba—Ti based phase impurities, particularly when the starting mixture of barium and titanium reactants is not uniform or the reaction does not proceed to completion at the atomic scale. See, e.g., A. D. Hilton & R. Frost, "Recent Developments in the Manufacture of Barium Titanate Powders", Key Engineering Materials, Vols. 66 & 67, 1992, pp. 145–184. In addition, BT particles formed by the solid-state route are often comprised of coarse aggregates with average particle sizes greater than 1 micron. See, e.g., D. F. K. Hennings, B. S. Schreinemacher, and H. Schreinemacher, "*Solid-State Preparation of BaTiO3-Based Dielectrics, Using Ultrafine Raw Materials*", J. Am. Ceram. Soc., 84 [12], 2777–2782 (2001). The particle size distribution of BT particles formed by the solid-state route is usually not narrow and monomodal because of the high calcination temperatures necessary to complete the solid-state diffusion reaction. Thus, the coarse aggregates must be physically reduced in size using a de-agglomeration step (i.e., by pulverization and/or milling) in order to be useful in the manufacture of electronic components and devices. This de-agglomeration step increases the risk of introducing undesirable impurities into the material and, because intense energy is required to reduce the particle size, it can alter certain desirable properties of the material, such as crystallinity, which makes it less suitable for use in electronic components.

In view of the foregoing disadvantages, many alternative processing routes have been developed for the production of high-purity BT powder. Such alternative processing routes include microemulsion processing, coprecipitation processing, sol-gel processing, hydrothermal synthesis, molten salt reactions, processing from polymeric precursors, and various oxalate and citrate processing routes. A number of these prior art methods can be used to produce fine submicron BT powders of near uniform size, but they have not been widely practiced on a commercial scale. This is because they often require exotic manufacturing schemes, have low product yields, and/or use exotic and/or expensive precursor materials.

Some wet chemical processes such as sol gel and hydrothermal processes are practiced commercially. These processes can be used to produce BT powder that has a fine particle size and monomodal PSD, but the individual particles are known to possess a significant degree of internal porosity. See, e.g.: D. F. K. Hennings, C. Metzmacher, and B. S. Schreinemacher, "*Defect Chemistry and Microstructure of Hydrothermal Barium Titanate*", J. Am. Ceram. Soc., 84 [1], 179–182 (2001); and J. Fukazawa, I. Osada, T. Shioya, K. Ochiai, S. Tanabe, and T. Kunieda, "*Properties of Barium Titanate Powders for Thin Layer MLCCs Produced by Chemical Processes*", CARTS 2000: 20th Capacitor and Resistor Technology Symposium, 6–10 March 2000. This internal porosity is an undesirable feature that typically results in a BT powder that exhibits less tetragonality than BT powders derived from solid-state or oxalate routes. Moreover, when such powders are formulated and fabricated into MLCC's, they commonly yield lower dielectric constants and higher dissipation factors than MLCC's formed using BT powders derived from solid-state or oxalate routes. Of course these powders can be calcined at temperatures high enough to remove the inherent internal porosity, which increases the degree of tetragonality and density, however, this then compromises the fine particle size and often results in a large particle size fraction that is undesirable. BT powders made by these processes also tend to have higher costs of manufacture because of higher raw material costs and more complicated processing requirements.

A process for preparing BT powder described by Clabaugh, W. S., Swiggard, E. M., and Gilchrist, R., in an article entitled, "*Preparation of Barium Titanyl Oxalate Tetrahydrate for Conversion to Barium Titanate of High Purity,*" Journal of Research of the National Bureau of Standards, Vol. 56, No. 5, 1956, pp. 289–291, which is known in the art as the "Clabaugh Process", is used conventionally to produce BT powder on a commercial scale. In the Clabaugh Process, a mixture of an aqueous solution of titanium oxychloride ($TiOCl_2$), hydrochloric acid (HCl) and barium chloride ($BaCl_2$) is added slowly to an aqueous solution of oxalic acid ($C_2H_2O_4$) in a vessel at a temperature of about 80° C. and vigorously stirred to precipitate barium titanyl oxalate tetrahydrate ($BaTiO(C_2O_4)_2.4H_2O$) (barium titanyl oxalate is hereinafter sometimes abbreviated as "BTO"). The BTO is then washed with distilled water and vacuum filtered. After drying in air, the BTO is calcined at a temperature of about 900° C., or higher, to convert it to BT particles. After calcination, the BT particles are typically highly crystalline and dense, however the PSD is usually broad and bimodal rather than narrow and monomodal.

The Clabaugh Process, while widely used commercially, suffers from several limitations. As noted above, for example, it does not yield a BT powder having a fine particle size and a narrow and monomodal PSD. De-agglomeration of the large calcined aggregates requires a high-energy milling step that tends to significantly degrade the inherent tetragonality present in the pre-milled BT powder. The Clabaugh Process also requires the use of at least three reaction vessels with heating capability to run the reaction and typically results in product yields of only about 93 to 97%. The volumetric efficiency of the Clabaugh Process is also relatively low, generating only approximately 0.3 kgs of BT per gallon of reaction slurry.

As previously noted, the consumer demand for electronic product miniaturization requires thinner fired dielectric layers in MLCC's. In order to achieve this and maintain the integrity of the thinner MLCC's, the dielectric powders used to form these layers must also become finer in size. These new requirements have led to many variations of the Clabaugh process and in particular, the last decade has seen a strong renewed interest in the oxalate synthesis technology. Some examples of the research that has occurred in the field of BTO synthesis using a modification of the Clabaugh process are now described.

Frank Schrey studied the effects of pH on the chemical precipitation of barium-strontium titanyl oxalates and found that the level of strontium that can be doped into the BTO is a strong function of the pH used during the precipitation. See Frank Schrey, "*Effect of pH on the Chemical Preparation of Barium-Strontium Titanate*", J. Am. Ceram. Soc., 48 [8], 401–405 (1965).

Yamamura et al. prepared BTO by adding an ethanol solution to the oxalic acid solution. See H. Yamamura, A. Watanabe, S. Shirasaki, Y. Moriyoshi, and M. Tanada, "*Preparation of Barium Titanate by Oxalate Method in Ethanol Solution*", Ceramics International, Vol. 11 [1], 17–22 (1985). The authors of the article also studied the effects of starting reagents, reaction temperature, and titration rates. Under certain conditions they were able to produce very fine particles of crystalline barium titanate, having an average PSD of about 0.3 microns. However, it appears that the process is very dilute because of the large amounts of ethanol used. Thus the process would probably not be cost effective from a commercial perspective because of the large amounts of ethanol used in the reaction and for the washing of the product.

Wilson et al., U.S. Pat. No. 5,783,165, disclose a process whereby barium carbonate powder is added directly to an aqueous solution of oxalic acid and titanium oxychloride that is maintained at a temperature of between 30° C. and 90° C. The patent states that BTO made this way was calcined at 1125° C. for 5 hours and then jet-milled to de-agglomerate the powder. The resulting barium titanate was said to be fine grained, between 0.2 and 0.45 microns in average particle size. X-ray diffraction scans showed that the barium titanate was crystalline, but that it did not exhibit a high degree of tetragonal splitting as can be seen in their figures.

Hennings et al., U.S. Pat. No. 5,009,876, disclose a process in which the order of addition of reactants typically used in the Clabaugh Process is modified, and the reaction temperatures typically used in the Clabaugh Process are varied to obtain a finer particle barium titanate particle ranging between 0.2 and 0.5 microns. However, the patent discloses that the particles have a Ba/Ti ratio between 0.975 and 0.985, which is significantly less than the desired target of 1.000. No X-ray diffraction patterns are shown or described in the patent, so the degree of tetragonality for the milled BT powder is unknown.

BTO has been prepared from barium salts other than barium chloride. Examples are barium nitrate and barium acetate. See, e.g., W. E. Rhine, K. Saegusa, R. B. Hallock, and M. J. Cima, "*Control of Ceramic Powder Composition by Precipitation Techniques*", Ceramic Transactions (1990), 12 (Ceramic Powder Science III), 107–118, wherein the authors studied the effects of reaction time and pH on BTO made from barium acetate or barium nitrate and titanyl ammonium oxalate.

Hari S. Potdar et al. precipitated BTO from extremely dilute solutions of barium acetate (0.01M) and potassium titanyl oxalate (0.01M). See H. S. Potdar, P. Singh, S. B. Deshpande, P. D. Godbole, and S. K. Date, "*Low-Temperature Synthesis of Ultrafine Barium Titanate (BaTiO3) Using Organometallic Barium and Titanium Precursors*", Materials Letters, Vol 10 [3], 112–117 (1990). Upon decomposition of this powder at 550° C. for 6 hours they were able to produce crystalline BT particles that were <200 nm in size and also monodispersed and spherical. However, the X-ray diffraction pattern showed no evidence of any tetragonality and they did not measure Ba/Ti ratios for their powders.

In H. S. Potdar, S. B. Deshpande, and S. K. Date, "*Alternative Route for Synthesis of Barium Titanyl Oxalate: Molecular Precursor for Microcrystalline Barium Titanate Powders*", J. Am. Ceram. Soc., 79 [10], 2795–2797 (1996), the authors describe a route for precipitating BTO by reacting an alcoholic solution containing butyl titanate monomer and oxalic acid dihydrate with an aqueous solution of barium acetate. By decomposing the BTO in air at about 1050° C. for 4 hours they generated a crystalline BT powder that does display some tetragonality, as can be seen in the X-ray diffraction pattern. However, no measurements of particle size or Ba/Ti ratio are given. The process is very dilute having a volumetric efficiency of less than 0.1 kg of BT per gallon of reaction slurry and a low product yield of only about 85%.

When comparing and contrasting all the existing commercial methods for making BT powder, it is apparent that there is presently no single practical method that can simultaneously produce a BT powder possessing all of the physical and chemical attributes that are required for a fine particle "ideal" BT powder. Therefore, a new chemical process is needed to address the deficiencies in the existing processes.

BRIEF SUMMARY OF THE INVENTION

The present invention provides a method of making BT powder by thermal decomposition of a BTO precursor that is prepared using barium acetate ($Ba(C_2H_3O_2)_2$) and a solution of titanium oxychloride and oxalic acid dihydrate as starting materials. In a preferred embodiment, the method of the invention comprises adding barium acetate powder to a stirred aqueous slurry solution of oxalic acid dihydrate and titanium oxychloride at an ambient temperature (~10° C.–30° C.) to precipitate BTO, which is then calcined to obtain agglomerated BT powder. Preferably, no barium chloride is used in the method of the invention. The agglomerated BT powder is then subjected to a particle comminution step to reduce the particles to a finer size.

The method of the invention provides several advantages over the Clabaugh Process including, for example, the need for only one reaction vessel, the ability to carry out the reaction at ambient temperatures rather than at elevated temperatures, higher barium titanate yields (>99%), and improved volumetric efficiency (>0.6 kgs BT per gallon of solution). The agglomerated BT powder formed in accordance with the method of the invention can be comminuted to a fine average particle size of between 0.3 and 0.5 microns that exhibits well defined tetragonality, a narrow and monomodal PSD, high purity, and a uniform particle morphology, making it a desirable material for use in a variety of electronic applications including, for example, the fabrication of high quality MLCC's and thermistors.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
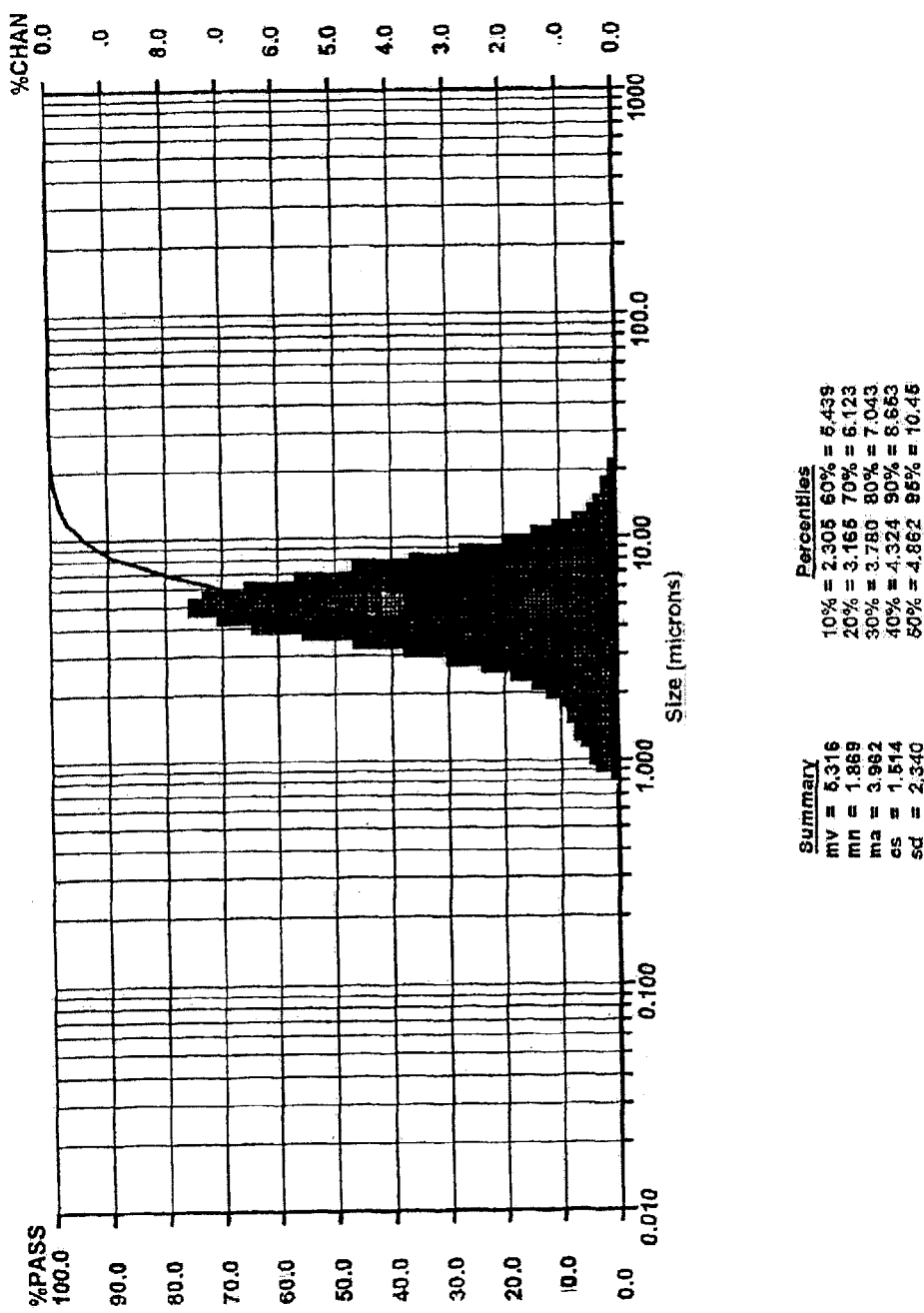
FIG. 1 is a graph showing the particle size distribution of precipitated BTO particles formed in Example 1.

The method of the present invention for making BT powder comprises adding barium acetate to a solution of oxalic acid and titanium oxychloride to form BTO and calcining the BTO to obtain BT powder. More preferably, the method of the invention comprises adding barium acetate powder to a stirred aqueous slurry solution of oxalic acid, hydrochloric acid and titanium oxychloride to form a hydrated BTO as a precipitate, which is then recovered and thermally decomposed to form BT powder.

It has been determined that changing the order of addition (i.e., adding oxalic acid dihydrate powder to a stirred aqueous solution of barium acetate, hydrochloric acid and titanium oxychloride) is not advantageous. The X-ray diffraction pattern of BT powder derived from calcination of BTO precipitate formed in this manner is observed to be multi-phased, comprised of BT and other phases that are not desirable.

Unlike the Clabaugh Process, the reaction can be conducted at a commercially acceptable rate when the solution is at ambient temperature (e.g., about 10° C. to about 30° C.). The addition of barium acetate to the solution produces only a slight exotherm, typically about 5° C. to about 10° C., which need not be controlled in the process.

It has been determined that when the initial solution temperature (i.e., the temperature of the solution prior to any exotherm produced by the addition of barium acetate) is higher than 30° C. at the time of the barium acetate addition, the BT powder obtained from calcining the resulting BTO will typically exhibit a coarse tail in its particle size distribution. For example, when BTO, which was precipitated from an aqueous solution that was initially 31° C. when the barium acetate was added, was decomposed at 1100° C., a BT powder was obtained that had a maximum particle size of 37 microns. However, when BTO, which was precipitated from aqueous solutions having temperatures within the range of from about 15° C. to about 25° C., was decomposed at 1100° C., the resulting BT powder typically had a maximum particle size of between 13 and 18 microns. In addition, the degree of tetragonality was observed to be significantly less for the BT derived from the higher temperature BTO precipitation.

It is not known if the coarse particle tail observed in BT powder derived from BTO formed by adding barium acetate to a solution having an initial temperature higher than 30° C. is detrimental to the final particle size distribution of the comminuted BT powder. However, since there appears to be no apparent advantage provided by heating the solution to an initial temperature that is greater than 30° C., an initial temperature of about 30° C. is considered to be the preferred upper limit for the solution.

Cooling the initial solution to a temperature below 10° C. showed no significant effect on the final unmilled BT's particle size distribution or on the degree of tetragonality. Therefore, the preferred initial temperature range for the solution is from about 10° C. to about 30° C., and more preferably from about 20° C. to about 25° C., which is ambient for most production environments.

Deionized (hereinafter sometimes abbreviated "DI") water is preferably used as the solvent to form the solution of oxalic acid, hydrochloric acid and titanium oxychloride. Preferably, from about 2.1 moles to about 2.5 moles of oxalic acid are added to the deionized water for every mole of titanium oxychloride added therein. Most preferably, about 2.32 moles of oxalic acid are used for every mole of titanium oxychloride dissolved therein.

It is preferable to form a highly concentrated solution in order to maximize volumetric efficiency during the reaction. Typically, about 385 grams of oxalic acid dihydrate and about 417 grams of titanium oxychloride (assuming a 60% $TiCl_4$ concentration) can be dissolved in 0.8 to 1.0 liter of deionized water to form the solution. The resulting solution is so concentrated that all of the oxalic acid dihydrate powder does not dissolve, which is why the system is sometimes referred to herein as an aqueous slurry solution.

Barium acetate powder is available commercially from a large number of sources. Typically, the barium acetate powder will be in the anhydrous form ($Ba(C_2H_3O_2)_2$), which is a white crystalline powder. It will be appreciated that various hydrates of barium acetate can be used.

In the preferred embodiment of the invention, barium acetate powder is added continuously and rapidly to a stirred aqueous slurry solution of oxalic acid, hydrochloric acid and titanium oxychloride. BTO particle nucleation begins and continues throughout the addition of the barium acetate powder. Shortly after the addition is completed, the slurry will typically thicken significantly for a period of time during which adequate mixing conditions are recommended to ensure that no "dead zones" of slurry occur in the reaction vessel. After a few minutes the viscous slurry will be observed to "thin out" and mix well at the same conditions.

From about 1.00 mole to about 1.30 moles, and most preferably 1.16 moles, of barium acetate should be added for each mole of titanium oxychloride present in the solution in order to precipitate stoichiometric BTO, which is typically in a hydrated form (BaTiO($C_2O_4$)$_2$.x$H_2O$).

The particle size of the barium acetate powder does have an affect on the degree and rate of thickening that occurs in the slurry soon after the barium acetate powder has been added. If the barium acetate particle size is too small then the rate of reaction may be too fast and excessive thickening of the slurry may occur resulting in "dead zones" which are defined as pockets of solids in the slurry that are not mixing. Eventually, over the period of a few minutes, the "dead zones" will work their way into the mixing slurry and thin out, however, this is an undesirable situation. Barium acetate powders having tap densities of less than about 1.3 g/cc are subject to reacting too quickly and forming "dead zones". The preferred tap densities for the barium acetate powder is between 1.4 and 1.5 g/cc.

The morphology of the BTO particles precipitated from the solution is strongly dependent on the concentration of the reaction slurry. The aqueous acidic TiOCl$_2$ solution used in the invention is always taken to have a TiCl$_4$ concentration of about 60%.

When the ratio of the DI water to the TiOCl$_2$ solution (hereinafter sometimes designated "DI/Ti ratio") is less than about 1.9, the resulting BTO particles are euhedral and diamond shaped (see Example 2A). When this ratio is greater than about 2.3, the aggregated BTO particles approximate blocky discoidal shapes (see Examples 2C & 2D).

The average BTO particle size is relatively invariant over a reasonable range of the processing conditions. Optimally, the precipitated BTO particles will have an average size of about 4 to 6 microns prior to calcination, as described in accordance with this invention. DI/Ti ratios less than about 1.9 also result in BT powder with extremely high chloride values, for example, >2,000 ppm, and a high Ba/Ti ratio, which are considered to be undesirable for certain electronic applications.

Although it may be possible to solve these problems by significantly altering the washing procedure, there is no real benefit in doing so because the volumetric efficiency of the process is already very high and would only increase slightly. In addition, the thickening phase observed early after the addition of the barium acetate would be enhanced and would need to be addressed. Therefore, the preferred DI/Ti ratio is 1.9 to 2.4, with the most preferred ratio being 2.0 to 2.1.

After the barium acetate powder has been added, the time allowed for the slurry to react is typically 4 hours. Varying this reaction time between 2 and 5 hours yielded BT powders that showed no significant differences in particle morphology or particle size, crystallinity, and chloride content (see examples 2K & 2L). The preferred range for the time that the slurry is allowed to react is therefore, 1 to 5 hours, with the most preferred range being 2 to 4 hours.

The BTO precipitate can be washed and recovered from the reactor by conventional means such as vacuum filtration. Preferably, the BTO is decant-washed in DI water using a dilution factor of 5 to 1. For example, if the reaction slurry volume was 6 gallons, then the slurry would be transferred to a larger vessel and diluted to about 30 gallons in total volume. Decant-washing is very slow without a flocculant system and therefore one can be used to improve the process cycle time. One such system is Nalco's PK2230 flocculant which is used in quantities less than 1.0% by weight with respect to the total diluted system weight.

Washing is required to remove chloride and acetate ions along with the excess barium and oxalate ions that were used in the reaction. Preferably, the BTO is decant-washed about 6 to 9 times until the solution conductance is reduced to an equillibrium value of about 300 microSiemens ($\mu$S) or less. Washing to a higher conductance will typically leave excess barium in the product that can result in a barium titanate exhibiting a Ba/Ti ratio significantly higher than 1.000. In addition, chloride levels in the barium titanate will typically be higher, for example greater than 100 ppm, which is unacceptable for fabricating MLCC's. Washing to too low of a conductance can result in a Ba/Ti ratio that is too low in the final barium titanate product.

After washing, the BTO is preferably dewatered using, for example, a vacuum nutsch or optionally, it can be spray dried. With vacuum filtration, the resulting damp cake can be oven dried and screened, or optionally charged directly to one or more ceramic saggers for calcination at a temperature of from about 800° C. to about 1250° C. for a period of from about 1 hour to about 8 hours. The calcination step is required to thermally decompose the BTO precursor into the desired BT particles. More preferably, the BTO is calcined at a temperature of from about 1000° C. to about 1200° C. for a period of from about 2 hours to about 6 hours to form BT particles. The BT particles or powder obtained after calcination will have a uniform particle size, a narrow and monomodal size distribution, a high degree of crystallinity, and a composition near stoichiometry.

Unmilled BT powder obtained by calcination of the BTO precursor at 1100° C. will typically have an average particle size of about 3 to 5 microns and an average maximum particle size of about 13 to 18 microns as measured by laser light scattering (the manner of making the measurement is discussed in greater detail in the Examples below). The particle size distribution is observed to be narrow and Gaussian in shape. The normalized breadth of the distribution can be defined in terms of the particle size distribution parameters. For example, it can arbitrarily be defined as (d90-d10)/d50. Using this definition, the normalized breadth of the PSD curve is about 0.83+/−0.03.

In the preferred embodiment of the invention, the agglomerated calcined BT particles are comminuted to an average particle size of about 0.3 $\mu$m to about 0.5 $\mu$m. Comminution is preferably accomplished using a wet media milling process such as can be accomplished using an Attritor mill or using Netzsch milling equipment. Dry milling techniques, such as jet milling for example, are generally not preferred because they tend to adversely affect the desired crystallinity of the final particles.

The crystalline state of the BT is often characterized in terms of the degree of tetragonality observed in the X-ray diffraction pattern. In cubic BT, the (200), (020), and (002) reflections are equivalent and therefore are superimposed on one another at about 45 degrees 2-theta on the X-ray diffraction pattern when using Cu radiation. As the BT crystallites that comprise each powder particle increase in size, they begin to exhibit tetragonal characteristics. This means that the c-axis in the unit cell increases in length relative to the a and b axes and therefore results in the (002) reflection moving to a lower 2-theta value in the X-ray diffraction pattern. At first this is observed as a shoulder that protrudes out from the original peak. As crystallite size continues to increase, a high degree of splitting is observed as the peak for the (002) reflection becomes more distinct and it migrates towards a lower 2-theta value from the composite peak formed by the (200) and (020) equivalent reflections. The tetragonal splitting parameter (TSP) is an arbitrary measure of the tetragonal crystalline state of the barium titanate. It is defined by the ratio of the height of the valley that forms between the (002) and (200, 020) reflections divided by the height of the (200, 020) reflection above background expressed as a percent. For the unmilled barium titanate obtained by calcination of the BTO at 1100° C., the TSP is typically 15%+/−5%. TSP values as high as 30% have also been observed.

Multi-point B.E.T. surface areas were measured on a Quanta Chrome Autosorb-6B instrument. The surface area for the BT powders calcined at 1100° C. range from about 0.6 to about 1.1 $m^2/g$.

The leachable chloride ion in the barium titanate powder was measured using an ion chromatography technique. A sample was prepared for analysis by mixing 1 g of BT powder with 30 g of DI water and heating the mixture in an autoclave at 110° C. for about one hour. The solution was then analyzed using a Dionex #120 instrument. The typical range of chloride was observed to be between about 10 and 100 ppm, depending on the precipitation and wash conditions employed.

The process according to the invention provides several advantages over prior art processes for manufacturing BT from a precipitated BTO precursor. For example, the BT powder yield from the Clabaugh Process is typically about 94–96% whereas the BT powder yield from the process according to the present invention is >99%. Moreover, the process according to the present invention can be practiced using a solution at ambient temperature conditions thereby eliminating the need for heating or cooling requirements. In addition, the process according to the invention provides substantial improvements in volumetric efficiency as compared to the Clabaugh Process. Typically, only about 79 grams of BT powder are obtained for every liter charged to the reactor in an optimized Clabaugh Process reaction. In the present process, about 198 grams of BT powder are obtained for every liter charged to the reactor, which is a 2.5 fold increase in volumetric efficiency.

In some prior art processes used for making BT powders, including the Clabaugh Process, the barium source is barium chloride. It is well known that the presence of chloride ions ($Cl^-$) in the final barium titanate can lead to inferior ferroelectric properties. In the method of the present invention, barium acetate (rather than barium chloride) is used as the barium source, which helps reduce the potential for chlorine ion contamination. Alternatively, barium hydroxide can be used. Preferably, barium chloride is not used in the process.

In the Clabaugh Process, the barium chloride salt is first put into an aqueous solution prior to being combined with the remaining materials to form the BTO. This necessitates the use of multiple tanks or vessels (typically three) for containing and/or mixing and reacting the raw materials. However, by using barium acetate powder as the barium source, only a single reaction vessel is required for producing the BTO. It is also no longer necessary to form a barium salt solution, which reduces the number of manufacturing steps and simplifies production of the BT powder.

Thus, in summary, the BTO particles precipitated from solution will generally be in the form of a hydrate and exhibit an average particle size of from about 4 to about 6 $\mu m$. The hydrate is not a tetrahydrate as is obtained in the Clabaugh Process, but rather is believed to be a dihydrate. After calcination, agglomerated BT particles are obtained having an average particle size of about 3 to about 5 $\mu m$. These BT particles are preferably comminuted using a wet milling technique to obtain BT particles having an average particle size of from about 0.3 to about 0.5 $\mu m$. The comminuted BT particles exhibit high density (typically >99% theoretical) and a narrow PSD.

The following examples are intended only to illustrate the invention and should not be construed as imposing limitations upon the claims.

EXAMPLE 1

A hydrated BTO precursor was prepared using the following raw materials: technical grade oxalic acid dihydrate (>99% purity) from Aldrich Chemicals; reagent grade barium acetate (99–102% purity) from Spectrum Chemicals; and aqueous acidic $TiOCl_2$ solution with a $TiCl_4$ concentration of 59.2% from Millenium Chemicals. A 5-gallon plastic pail with a diameter of about 11" and a height of 14" was used as the reaction vessel.

3.752 kgs of oxalic acid dihydrate powder was charged to the reaction vessel. 7.5 kgs of DI water was then added. This mixture was agitated with a 4.5" diameter A-310 HALAR® coated blade at about 500 rpms. A polyproplyene carbuoy was charged with 4.0 kgs of aqueous acidic $TiOCl_2$ solution that was discharged into the reaction vessel under the stirred water level to avoid HCl fuming. After the discharge was complete, the carbuoy was rinsed with 300 grams of DI water, which was discharged into the reaction vessel.

The initial temperature of the aqueous acidic slurry was not controlled, but rather was permitted to remain at ambient conditions (which was believed to be about 22° C.). The aqueous acidic slurry was agitated for about 5 minutes. The mixer was increased in speed to about 1000 rpms and 3.865 kgs of barium acetate powder was rapidly added to this slurry while it was mixing. The addition time was 10 to 30 seconds. The container used to transfer the barium acetate powder was then rinsed with 200 grams of DI water, which was discharged into the reaction vessel. A few minutes after the barium acetate was added, the slurry was observed to thicken significantly and a few minutes after that it was observed to "thin out" to a lower viscosity that mixed well for the remainder of the reaction. No attempt was made to control the temperature of the solution after the addition of the barium acetate powder. The slurry was mixed for a total of 4 hours. During this time the reaction vessel was covered and vented to remove strong smelling acetic acid vapors and HCl vapors that were liberated during the reaction.

After the 4-hour cycle time was completed, the slurry was transferred to a 20-gallon plastic container for washing. The container was first filled with about 10 gallons of DI water before transferring the reaction slurry so as to dilute the acetic acid concentration and essentially eliminate the unpleasant odor. During the transfer, the slurry was agitated to assure good mixing with the DI water. After the transfer was completed, the reaction vessel was rinsed clean, and the rinse DI water was discharged into the container. The container was then filled with DI water to almost the top. The agitator was then turned off and the slurry was allowed to gravity settle for about 1 hour. The supernatant was clear and about 15 gallons of it was decanted out of the container so that there was only about 1" of solution covering the settled powder. Fresh DI water was then added to the container while the slurry was agitated. After the container was filled, the agitation was stopped and the slurry was allowed to settle again. This decant/wash procedure was repeated a total of about 8 times until, during the final filling of DI water, a slurry conductance of about 350 microSiemans was obtained. At this point the agitation was turned off and the slurry was allowed to settle overnight. The next morning the clear supernatant was decanted off and the washed slurry was dewatered on a Buchner funnel. The filtered damp cake was then over dried at 120° C. overnight. The dried BTO powder was then processed through a 30-mesh screen.

Figure 2A:
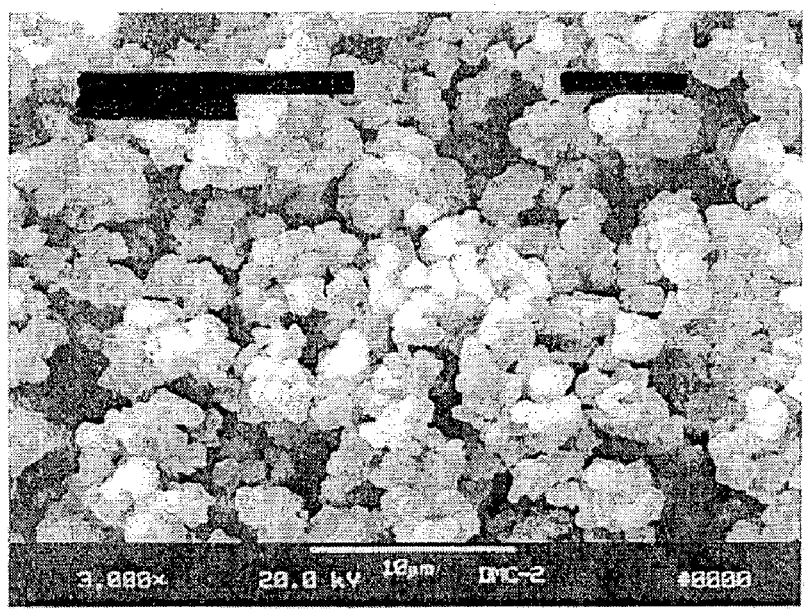
FIGS. 2A and 2B are scanning electron micrographs of precipitated BTO particles formed in Example 1.
Figure 2B:
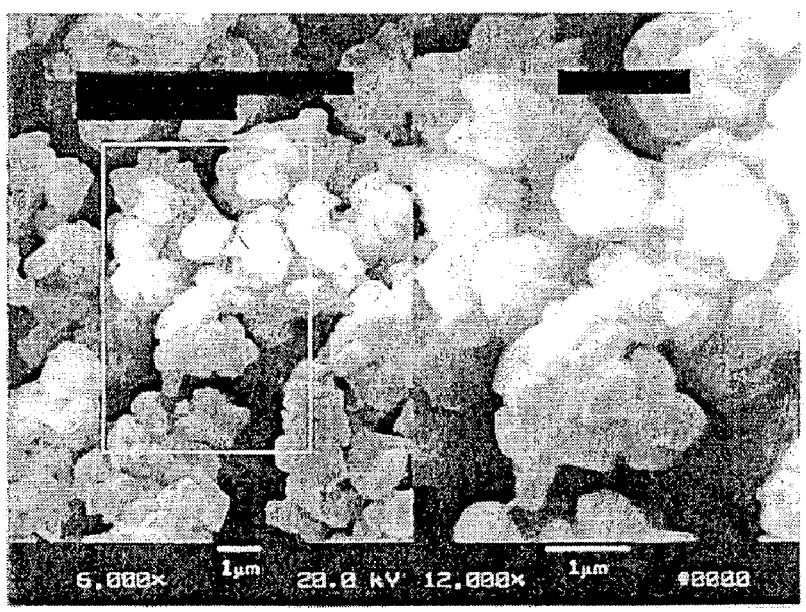

The particle size distribution of the BTO was measured by making a dilute slurry comprised of 1.5 g of the BTO powder, 20 g of isopropyl alcohol, 80 g of DI water, and 15 drops of DARVAN C® dispersant. The slurry was sonicated for 10 minutes at 400W of power (20 kHz) at 90% power and 75% pulsing. A few drops of this dispersion was used to measure the PSD of the BTO using a Honeywell Microtrac X100 particle size analyzer instrument. The measured particle size distribution parameters for this sample were as follows: d10=2.3, d50=4.9, d90=8.7, and d100=22 microns. A graph of the particle size distribution is shown in FIG. 1. Generally speaking, the precipitated BTO particles appear as ~5 micron aggregate particles comprised of many smaller faceted particles about 1 micron in size when examined using an SEM (see FIGS. 2A & 2B).

Some of the BTO was converted to BT by calcining the powder at high temperature. The calcination profile was programmed to ramp from room temperature to 350° C. at 10° C./minute, hold at 350° C. for 2 hours, ramp up to 110° C. at 5° C. /minute, hold at 1100° C. for 3 hours, and then turn off.

The particle size distribution of the resulting aggregated barium titanate powder was measured by making a dilute slurry comprised of 1.5 g of BTO powder, 10 g of DI water, and 15 drops of DARVAN C® dispersant. The slurry was sonicated for 10 minutes at 400W of power (20 kHz) at 90% power and 75% pulsing. A few drops of this dispersion were used to measure the PSD of the BT using a Honeywell Microtrac X100 particle size analyzer instrument. The measured particle size distribution parameters for this sample were as follows: d10=2.2, d50=3.6, d90=8.2, and d100=37 microns.

Figure 3:
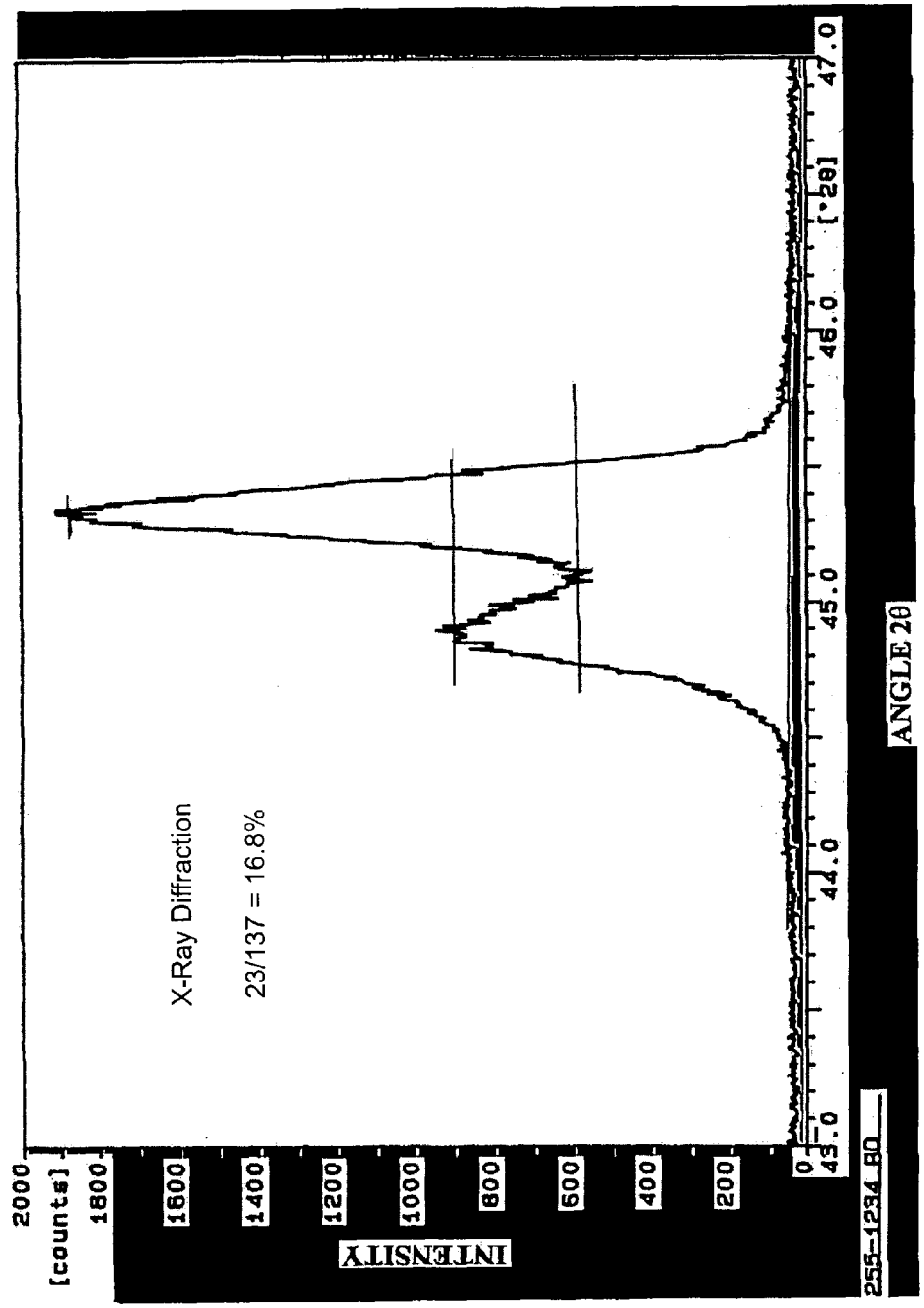
FIG. 3 is a graph showing the degree of tetragonal splitting for BT particles obtained after calcination at 1110° C. in Example 1.

The degree of tetragonal splitting for the BT powder was obtained from an X-ray diffraction-scan using a Philips 1410 X-ray diffractometer. The scan ranged from 43° to 47° 2-theta. The tetragonal splitting parameter (TSP) for this powder was measured to be 16.8% using the technique described earlier. See FIG. 3.

Figure 4:
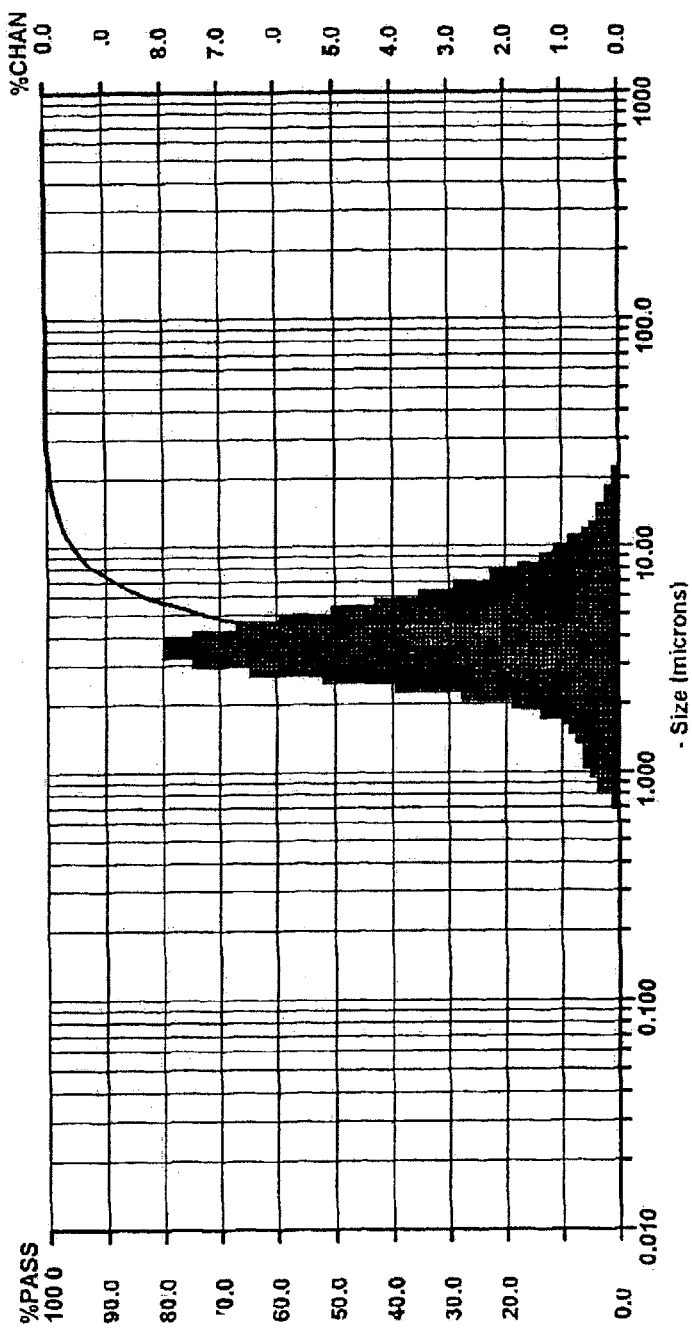
FIG. 4 is a graph showing the particle size distribution of BT particles obtained after calcination at 1025° C. in Example 1.

The remaining BTO powder was calcined at 1025° C. for 3 hours. The calcination profile was programmed to ramp from room temperature to 350° C. at 5° C./minute, hold at 350° C. for 2 hours, ramp up to 1025° C. at 3° C./minute, hold at 1025° C. for 3 hours, and then turn off. The measured particle size distribution parameters for this sample were as follows: d10=2.1, d50=3.8, d90=7.5, and d100=26 microns. A graph of this PSD is given in FIG. 4. The measured TSP for this calcined BT powder was about 2%.

Figure 5:
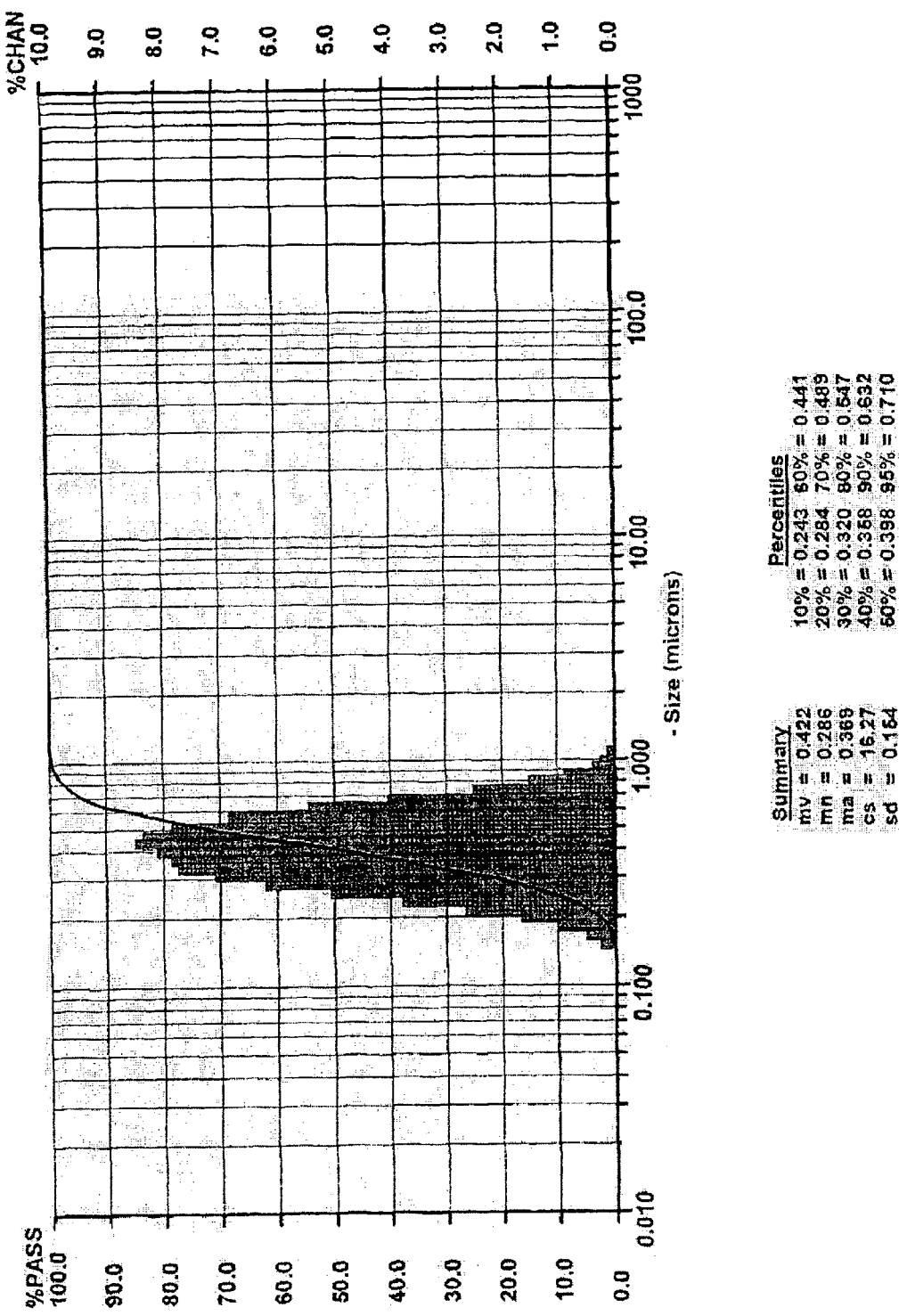
FIG. 5 is a graph showing the particle size distribution of BT particles obtained after calcination at 1025° C. and Attritor milling in Example 1.

The aggregated BT was then Aitritor milled to comminute the powder to a finer particle size. A 6-liter zirconia lined mill was used as the chamber, which was filled with 1.5 mm yttria-stabilized zirconia bead media. The media was turned using a spindle with protruding zirconia spokes. 1.5 kgs of a 1% DARVAN C® DI water solution was added to the mill. 2.5 kgs of the aggregated BT powder was charged slowly to the mill while it was being stirred at about 140 rpms. The powder was milled for 6 hours. It was then discharged from the chamber, which was rinsed clean with copius amounts of DI water. The slurry was allowed to stand overnight to settle. In the morning the clear supernatant was decanted off and the slurry was transferred to a buchner funnel where it was dewatered. The damp cake was then dried at 120° C. overnight and screened to <30 mesh. The milled BT had the following measured particle size distribution parameters; d10=0.24, d50=0.40, d90=0.63, and d100=1.16 microns. The PSD graph is shown in FIG. 5. The measured TSP was 11% and the multi-point B.E.T. surface area was 4.5 m$^2$/g.

EXAMPLE 2

A series of experiments were run to precipitate hydrated BTO using a range of process conditions. Reagent grade oxalic acid dihydrate (>99% purity) from Spectrum Chemicals, reagent grade barium acetate (99–102% purity) from Spectrum Chemicals, and aqueous acidic $TiOCl_2$ solution with a $TiCl_4$ concentration of 60% from Millenium Chemicals were used in the experiments. An 8-gallon HDPE tank with a diameter of about 12" and a height of 18" was used as the reaction vessel.

The experiments were designed to the study the effects of 5 process variables on the final BTO and BT properties. The variables chosen for study were: (1) the DI/Ti ratio; (2) the oxalic acid dihydrate excess over stoichiometry; (3) the barium acetate excess over stoichiometry; (4) the temperature of the aqueous solution slurry before adding the barium acetate; and (5) the reaction time. The variables and the testing ranges are shown in Table 1 below:

TABLE 1

| EXAMPLE | VARIABLE | RANGE |
| --- | --- | --- |
| 2A–2D | DI/Ti Ratio | 1.9 to 3.0 |
| 2E & 2F | Oxalic Excess | 19% to 13% |
| 2G & 2H | Barium Excess | 23% to 17% |
| 2I & 2J | Slurry Temperature | 18° C. to 31° C. |
| 2K & 2L | Reaction Time | 2 to 5 hours |

In each experiment, oxalic acid dihydrate powder was added first to the 8-gallon reaction vessel. Most of the deionized (DI) water was then added to the vessel, with the remainder being held back for future rinsing needs. The mixture was agitated with a 6" diameter A-200 HALAR® coated blade at about 250 rpms. An HDPE carbuoy was charged with 6.0 kgs of aqueous acidic $TiOCl_2$ solution that was discharged into the vessel under the stirred solution level to avoid HCl fuming. After the discharge was complete the carbuoy was rinsed with 500 grams of DI water, which was then discharged into the pail. The temperature of the aqueous acidic slurry was not measured except for experiments 2I and 2J, so it was considered to be at an ambient condition (typically between 20° C. and 25° C.).

The aqueous acidic slurry was agitated for about 5 minutes. The mixer was increased in speed to about 350 rpms and the barium acetate powder was rapidly added to this slurry while it was mixing. The addition time was about 20 to 30 seconds. The container was then rinsed with 300 grams of DI water, which was discharged into the vessel. A few minutes after the barium acetate was added, the slurry was often observed to thicken significantly and a few minutes after that it was observed to "thin out" to a lower viscosity that mixed well for the remainder of the reaction. The slurry was agitated for the designated reaction time. During this time the vessel was covered and vented to remove strong smelling acetic acid vapors and HCl vapors that were liberated during the reaction.

After the reaction time was completed, the slurry was transferred to a 32-gallon plastic container for washing. The container was first filled with about 15 gallons of DI water before transferring the reaction slurry so as to dilute the acetic acid concentration and essentially eliminate the unpleasant odor. During the transfer the slurry was agitated to assure good mixing with the DI water. After the transfer was completed the reaction vessel was rinsed clean, and the rinse water was discharged into the container. The container was then diluted with DI water to almost the top and 850 grams of Nalco's PAINTKILL® 9512 was added to the slurry. The slurry was allowed to agitate for 3 to 5 minutes. 600 grams of an aqueous flocculent solution containing 20% by weight of Nalco's PAINTKILL® 9230 was then added to the slurry which causes it to flocculate. After about 1 to 3

The particle size distribution of the resulting aggregated BT powders was measured for each sample using the procedure described in Example 1. The PSD parameters, TSP, multi-point surface area, and chloride content for each BT powder are given in Table 2 below. The Ba/Ti mole ratio was measured by fusing the powder into glass pellets that were then analyzed using a Philips XRF unit. After calcination a small sample of each BT powder was allowed to sit for a few or more days while exposed to air. 5 grams of BT powder was mixed with 100 grams of DI water and then stirred on a hot plate with a magnetic stir bar for 15 minutes. The conductance and pH of each slurry was then measured and are reported in Table 2 below:

TABLE 2

| | Reaction Conditions | | | | | BTO Precipitate | | | BT Powder After Calcination @ 1100° C. | | | | | | | | |
|---|---|---|---|---|---|---|---|---|---|---|---|---|---|---|---|---|---|
| Example | DI/Ti | Ba Exc | Ox Exc | T (° C.) | Time (Hrs) | Morphology | d50 ($\mu$m) | d100 ($\mu$m) | Ba/Ti | d10 ($\mu$m) | d50 ($\mu$m) | d90 ($\mu$m) | d100 ($\mu$m) | TSP | Cl (ppm) | S. A. (m$^2$/g) | Cond. ($\mu$S) | pH |
| 2A | 1.9 | 20% | 16% | ~22 | 4 | Diamonds | 5.8 | 22 | 1.018 | 1.9 | 4.1 | 6.8 | 15.6 | 6% | 3307 | 0.61 | — | — |
| 2B | 2.1 | 20% | 16% | ~22 | 4 | Aggregates | 8.3 | 26 | 0.996 | 3.8 | 6.4 | 9.3 | 18.5 | 15% | <10 | 0.57 | 61 | 6.6 |
| 2C | 2.5 | 20% | 16% | ~22 | 4 | Discoids | 6.0 | 19 | 1.000 | 2.8 | 4.3 | 6.4 | 13.1 | 12% | 87 | 0.67 | 104 | 7.7 |
| 2D | 3.0 | 20% | 16% | ~22 | 4 | Discoids | 6.7 | 19 | 1.006 | 2.9 | 4.4 | 6.5 | 13.1 | 13% | 126 | 0.60 | 50 | 9.3 |
| 2E | 2.4 | 20% | 19% | ~22 | 4 | Discoids | 6.0 | 19 | 1.004 | 2.9 | 4.3 | 6.4 | 13.1 | 16% | 82 | 0.64 | 113 | 7.8 |
| 2F | 2.4 | 20% | 13% | ~22 | 4 | Discoids | 6.1 | 19 | 1.000 | 3.1 | 4.6 | 7.0 | 15.6 | 6% | 80 | 0.75 | 99 | 7.6 |
| 2G | 2.4 | 23% | 16% | ~22 | 4 | Discoids | 5.7 | 19 | 1.002 | 2.8 | 4.1 | 6.1 | 13.1 | 17% | 66 | 0.74 | 113 | 7.7 |
| 2H | 2.4 | 17% | 16% | ~22 | 4 | Discoids | 6.4 | 19 | 1.000 | 2.9 | 4.4 | 6.5 | 13.1 | 13% | 90 | 0.63 | 108 | 7.5 |
| 2I | 2.4 | 20% | 16% | 31 | 4 | Aggregates | 5.2 | 26 | 0.992 | 2.7 | 4.3 | 10.8 | 37.0 | 3% | <10 | 1.07 | 64 | 7.1 |
| 2L | 2.4 | 20% | 16% | 18 | 4 | Discoids | 5.6 | 19 | 1.004 | 2.4 | 3.5 | 5.2 | 11.0 | 20% | 94 | 0.75 | 49 | 9.5 |
| 2K | 2.4 | 20% | 16% | ~22 | 5 | Discoids | 6.0 | 19 | 1.001 | 2.6 | 3.8 | 5.7 | 11.0 | 17% | 92 | 0.74 | 54 | 8.5 |
| 2L | 2.4 | 20% | 16% | ~22 | 2 | Discoids | 4.7 | 19 | 1.002 | 2.9 | 4.3 | 6.4 | 13.1 | 16% | 79 | 0.79 | 111 | 7.3 | minutes the agitator was turned off and the slurry was allowed to gravity settle for about 30 to 45 minutes. The supernatant was clear and about 20 gallons of it was decanted out of the container so that there was only about 1" of solution covering the settled powder. Fresh DI water was then added to the container while the slurry was agitated. After the container was filled, 150 grams of the 20% flocculent solution was added. The slurry was allowed to agitate for about 1 to 3 minutes and the agitation was stopped and the slurry was allowed to settle again. This decant wash procedure was repeated a total of about 8 times until, during the final filling of DI water, a slurry conductance of about 300 microSiemans was obtained. At this point the agitation was turned off, no additional flocculent solution was added, and the slurry was allowed to settle overnight. The next morning the clear supernatant was decanted off and the washed slurry was dewatered on an 18" tabletop Buchner funnel. The filtered damp cake was then over dried at 120° C. overnight. The dried BTO powder was then passed through a 30-mesh screen.

The particle size distribution of the BTO was measured for each sample using the procedure described in Example 1. The d50 and d100 distribution parameters are given in Table 2 for each sample. SEM photographs of the BTO were taken at 3,000× and 6,000× magnification using an Amray 1820 instrument. BTO particle morphologies are arbitrarily described as diamonds, aggregates, and discoids. The results for all of the runs in Example 2 are given in Table 2 below.

The BTO was converted to BT by calcining the recovered BTO powders at high temperature. The calcination profile was programmed to ramp from room temperature to 350° C. at 10° C./minute, hold at 350° C. for 2 hours, ramp up to 1100° C. at 5° C./minute, hold at 1100° C. for 3 hours, and then turn off.

In Example 2, two washing aids (Nalco's PAINTKILL® 9512 and Nalco's PAINTKILL® 9230) were used to reduce cycle time in decant washing. It was observed that while cycle times were reduced as compared to Example 1 where no washing aids were used, an unexpected difficulty was later observed in subsequent milling of the calcined BT particles. In essence, it took longer to mill the calcined BT particles to the desired particle size when the two washing aids were used. This additional milling time was determined to adversely affect desired BT particle tetragonality. Applicants later determined that the Nalco PAINTKILL® 9512 washing aid contributed to this milling problem. Elimination of the Nalco PAINTKILL® 9512 material from the system did not have an adverse effect on the washing efficiency or cycle time, but it did reduce the required milling time to obtain desired particle sizes, thereby preserving the desired tetragonality., It has not been determined whether use of the Nalco PAINTKILL® 9230 material also contributes to the need for additional milling time to reach desired particle size. Thus, one has to balance the increase in decant washing efficiency provided by use of a washing aid with the potential negative impact such aids may produce in terms of milling time and particle tetragonality.

EXAMPLE 3

A hydrated BTO was prepared to determine the product yield for the process according to the invention. Reagent grade oxalic acid dihydrate (>99% purity) from Spectrum Chemicals, reagent grade barium acetate (99–102% purity) from Spectrum Chemicals, and aqueous acidic TiOCl$_2$ solution with a TiCl$_4$ concentration of 60% from Millenium Chemicals were used.

A 4-liter PYREX® beaker was used as the reaction vessel. To this, 747.5 grams of oxalic acid dihydrate powder was added. A total of 1.92 kgs of DI water was used for the reaction. 1700 grams was added initially to the oxalic acid and the remainder was held back for future rinsing of the containers that hold the other chemicals. The aqueous oxalic acid mixture was agitated with a 3" diameter A-200 Teflon® blade at about 300 rpms. A pyrex beaker containing 800 grams of aqueous acidic $TiOCl_2$ solution was then discharged into the 4-liter beaker. After the discharge was complete, the beaker was rinsed with 100 grams of DI water, which was then discharged into the reaction beaker. The temperature of the aqueous acidic slurry was not controlled so it was considered to be at ambient conditions (~22° C.).

The aqueous acidic slurry was agitated for about 5 minutes. The mixer was increased in speed to about 600 rpm and 780.3 grams of barium acetate powder was rapidly added to this slurry from a beaker while it was mixing. The addition time was about 20 to 30 seconds. The beaker was then rinsed with 120 grams of DI water, which was discharged into the pail. A few minutes after the barium acetate was added the slurry was observed to thicken significantly and a few minutes after that it was observed to "thin out" to a lower viscosity that mixes well for the remainder of the reaction. The slurry was mixed for a total of 4 hours.

Small samples of slurry were taken after 1, 2, 3, and 4 hours. These acidic solutions were then isolated by vacuum filtration. The clear filtrate was then analyzed for Ti concentration using an ICP method. The results for the 4 samples are: 20, 12, 11, and 12 ppm of Ti, respectively. This demonstrates that the BTO precipitated in this process is not soluble in its "mother liquor" thereby resulting in yields that exceed 99%.

After the 4-hour cycle time was completed, the filtered samples of BTO precipitate were added back to the final reaction slurry. This slurry was transferred to a 5-gallon plastic container for decant washing using a flocculent as described earlier. The slurry was washed to a final conductance of about 300 microSiemans. At this point the agitation was turned off and the slurry was allowed to settle overnight without adding additional flocculent. The next morning the clear supernatant was decanted off and the washed slurry was dewatered on a Buchner funnel. The filtered damp cake was then oven dried at 120° C. overnight. The dried BTO powder was then processed through a 30-mesh screen. The particle size distribution of the BTO was measured to be; d10=2.4, d50=4.7, d90=7.3, and d100=16 microns.

The BTO was converted to BT by calcining the powder at 1100° C. for 3 hours using the calcination profile described earlier. The particle size distribution of the resulting aggregated BT powder was measured to be; d10=2.4, d50=3.5, d90=5.4, and d100=13.1 microns. The tetragonal splitting parameter (TSP) for this powder was measured to be 17% and the chloride ion concentration was 122 ppm.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of making barium titanate powder comprising:
    adding barium acetate to a solution comprising oxalic acid and titanium oxychloride to form barium titanyl oxalate; and
    calcining the barium titanyl oxalate to obtain barium titanate powder.

2. The method according to claim 1 wherein the barium titanyl oxalate is recovered as a precipitate from the solution prior to calcination.

3. The method according to claim 2 wherein the precipitate is washed with deionized water prior to calcination.

4. The method according to claim 2 wherein the barium titanyl oxalate is recovered by filtration prior to calcination.

5. The method according to claim 2 wherein the barium titanyl oxalate precipitate has an average particle size of from about 4 $\mu$m to about 6 $\mu$m prior to calcination.

6. The method according to claim 1 wherein the solution of oxalic acid and titanium oxychloride comprises an aqueous solution.

7. The method according to claim 6 wherein the aqueous solution is formed using deionized water.

8. The method according to claim 7 wherein the molar ratio of oxalic acid to titanium oxychloride is from about 2.0 to about 2.5.

9. The method according to claim 7 wherein the molar ratio of barium acetate to titanium oxychloride is from about 1.0 to about 1.3.

10. The method according to claim 1 wherein the barium acetate is added to the solution when the solution is at a temperature of from about 10° C. to about 30° C.

11. The method according to claim 1 wherein the barium acetate is added to the solution when the solution is at a temperature of from about 20° C. to about 25° C.

12. The method according to claim 1 wherein the barium titanyl oxalate is calcined at a temperature of from about 800° C. to about 1250° C. for a period of from about 1 hour to about 8 hours.

13. The method according to claim 1 wherein after calcination the barium titanate powder is comminuted to display an average particle size within the range of from about 0.3 to about 0.5 microns.

14. A method of making barium titanate powder comprising:
    adding barium hydroxide to a solution comprising oxalic acid and titanium oxychloride to form barium titanyl oxalate; and
    calcining the barium titanyl oxalate to obtain barium titanate powder.

* * * * *